H. K. WOOD.
SHOVEL.
APPLICATION FILED JAN. 12, 1914.
1,099,958.
Patented June 16, 1914.
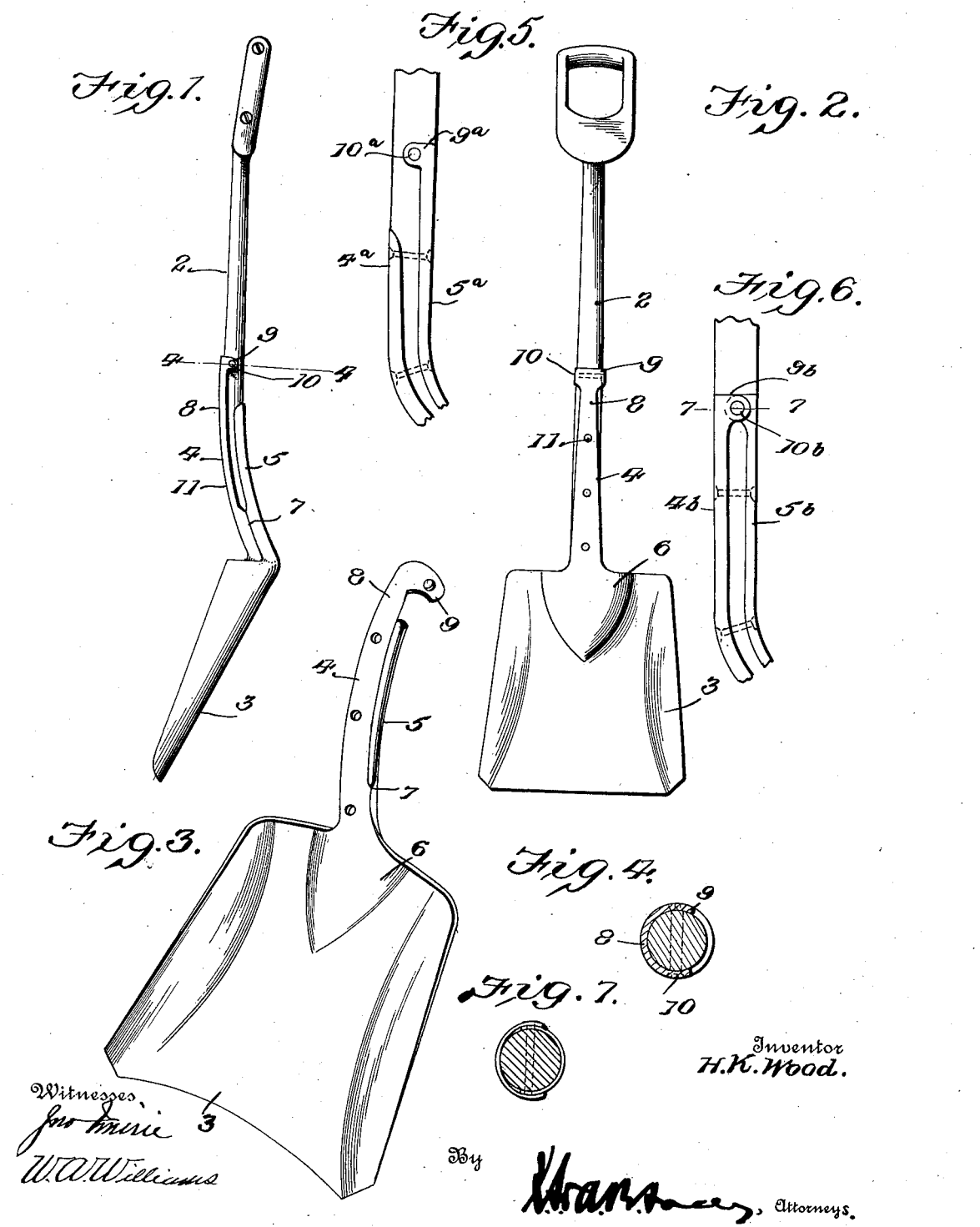
Inventor
H. K. Wood.

UNITED STATES PATENT OFFICE.

HARLEY K. WOOD, OF PIQUA, OHIO.

SHOVEL.

1,099,958.  Specification of Letters Patent.  Patented June 16, 1914.

Application filed January 12, 1914. Serial No. 811,630.

*To all whom it may concern:*

Be it known that I, HARLEY K. WOOD, citizen of the United States, residing at Piqua, in the county of Miami and State of Ohio, have invented certain new and useful Improvements in Shovels, of which the following is a specification.

My invention relates to shovels and particularly to what are known as three-piece shovels and to the means whereby the blades of such shovels are held to the handles.

In three-piece shovels as ordinarily constructed, the blade is held to the handle by a top strap and a bottom strap riveted to the blade and extending up above and below the handle and riveted to the handle by rivets extending in a plane at right angles to the plane of the blade. The two straps extend from the blade upward along the front and back of the handle for about the length of nine inches. In this form of shovel, the handle is attached to the blade usually by three but sometimes by two rivets passing through the front strap, the handle and the back strap at a right angle to the blade. Where three sets of rivets are used, the first rivet passes through the middle of the front strap about one inch above the heel of the blade, the second about three and three-quarter inches and the third rivet about eight and one-quarter inches. The last rivet passes through the front and back straps about an inch from the upper ends of these straps. This is the common method of attaching shovel blades to handles as made in all shovel plants.

There are many objections to the old way of constructing and uniting the handle to the shovel blade which is the object of my invention to remedy. For example, the hole made for the third or upper rivet, coming as it does so near the top of the straps in order to unite the straps and handle firmly at that point, weakens the handle at a point where the strain is the greatest, and where by reason of said hole and the direction in which the hole runs through the handle, nearly all breakages occur.

A shovel attached to the handle as above described is relatively weak and the primary object of my invention is to strengthen the shovel and strengthen the attachment of the handle to the shovel blade so that the shovel will withstand greater strains than is possible with shovels constructed as above described, and particularly to strengthen the shovel and the attachment of the handle to the blade against the abuse of the shovel in the hands of workmen, especially workmen employed by contractors and railroads who very often use the shovels as crowbars. Thus for example a railroad workman will quite commonly stick the shovel blade under the end of a railroad tie and then sit on the handle to thus pry up the track while ballast is tamped beneath the tie. This kind of abuse results in many broken handles, and the consequent expense to railroads, contractors, etc., is very large. It is this loss through breakage that I design to obviate by the construction now to be described.

My improved shovel is illustrated in the accompanying drawings wherein:

Figure 1 is a side elevation of a shovel constructed in accordance with my invention. Fig. 2 is a face view thereof. Fig. 3 is a perspective detail view of the shovel with the handle removed. Fig. 4 is an enlarged section on the line 4—4 of Fig. 1. Fig. 5 is a fragmentary side elevation of a shovel handle and the straps connecting the blade to the handle, the lower strap being increased in length over the upper strap and provided with ears. Fig. 6 is a like view to Fig. 5 but showing another modification in which both the upper strap and the lower strap are of equal length and provided with overlapping ears. Fig. 7 is a section on the line 7—7 of Fig. 6.

Corresponding and like parts are referred to in the following description and indicated in all the views of the accompanying drawings by the same reference characters.

Referring to these figures, 2 designates the handle of a shovel illustrated as constructed of wood and formed in any suitable manner, the particular construction of the handle not being part of my invention. The blade 3 is of the usual or ordinary form, and attached to the blade upon the top and bottom thereof or formed integral therewith are the upwardly extending, slightly curved straps designated respectively 4 and 5. It will be noted that these straps at their lower ends are formed with relatively wide blade engaging portions 6, and adjacent the blade these straps are transversely curved in a semicircular form so as to engage around the lower end of the handle and abut against each other as at 7. Above this point the side edges of the straps are cut away so that the straps while transversely curved do not entirely embrace the handle and do not abut against each other but are disposed upon the lower face and upper face respectively of the handle.

The particular point of my invention lies in extending the upper strap 4 rearward beyond the lower strap as at 8, and forming at the rear extremity thereof the oppositely disposed, downwardly extending ears 9, each ear being perforated for the passage of a transverse rivet 10. Rivets 11 extend in a plane at right angles to the plane of the blade and connect the lower portions of the straps to each other. These rivets are common in shovels of this character. The lower strap 5 in my improved shovel has preferably the usual length of nine inches, but the top strap 4 is preferably twelve inches long and therefore extends three inches beyond the lower strap. The rivet 10 is headed or overturned at both ends.

In Fig. 5 I show another form of my invention wherein the lower strap 5$^a$ is extended beyond the upper strap 4$^a$, the strap 5$^a$ being provided at its rear end with the ears 9$^a$ which partially surround the handle, the rivet 10$^a$ passing through the ears 9$^a$ and through the handle.

In Fig. 6 I show still another form in which the straps 4$^b$ and 5$^b$ are both of equal length, both of these straps being provided at their ends with the ears 9$^b$, these ears, however, overlapping as shown in Fig. 7, and having a rivet 10$^b$ passing through the overlapping ears and through the handle, this rivet of course being approximately parallel to the plane of the shovel blade.

It is to be particularly noted that inasmuch as rivet 10 (or 10$^a$ and 10$^b$) extends transversely to the rivets 11, it will extend transversely to the direction of a strain applied to the extremity of the handle instead of in the direction of said strain as do the rivets 11. Where the rivets extend all in one direction as in the ordinary form of handle, and that direction is the same as the direction of the strain applied to the shovel, the rivets will tend to pull out and the handle tend to be pulled away from its engagement with the straps. By providing rivets extending at right angles to each other and engaging the straps with the handle, I strengthen the handle against strain in any direction. It is also to be noted that the handle is strengthened beyond the curved portion thereof, and at a point where strength is necessary by the extension of the straps and the engagement of the ends of these straps with the handle through the transverse bolts 10, 10$^a$ and 10$^b$ as in the remaining figures.

My invention does not materially increase the cost of manufacture of shovels of this character, and it does materially increase the life of the shovel and its usefulness.

While I have described my invention with special reference to shovels properly so-called, I wish it understood that it is not limited to any specific form of shovel and that the invention is not limited solely to its use in shovels as other implements of like character may be constructed in accordance with my invention.

While I have illustrated the straps as being longer than ordinary straps and as being made in one single integral piece, I wish it understood that these extra long straps may in some cases be made in two pieces attached to each other without departing from the spirit of my invention.

What I claim is:

1. In a shovel, a blade, a handle, upper and lower straps connecting the blade to the handle, one of said straps being provided with ears disposed on each side of the handle, rivets passing through the handle and the upper and lower straps, and a rivet passing transversely through said ears and the handle.

2. In a shovel, a blade, a handle, upper and lower straps on the blade, one extending beyond the other, rivets passing through both of said straps and handle in one direction, and a transverse rivet extending through one of said straps and the handle in another direction.

3. In a shovel, a blade, a handle, upper and lower straps connecting the blade to the handle, one of said straps extending beyond the other and being provided with ears disposed on each side of the handle, rivets passing through the handle and the upper and lower straps, and a rivet passing transversely through said ears and handle.

4. In a shovel, a blade, a handle, upper and lower straps connecting the blade to the handle, the upper strap being extended beyond the lower strap and being provided at its extremity with downwardly extending ears embracing the handle, a series of rivets passing through both straps and the handle and disposed in a plane at right angles to the plane of the blade, and a rivet passing transversely through the handle and through the said ears.

In testimony whereof I affix my signature in presence of two witnesses.

HARLEY K. WOOD. [L. S.]

Witnesses:
E. B. DENMAN,
C. C. PROCTOR.

Copies of this patent may be obtained for five cents each, by addressing the "Commissioner of Patents, Washington, D. C."